United States Patent Office 3,472,158
Patented Oct. 14, 1969

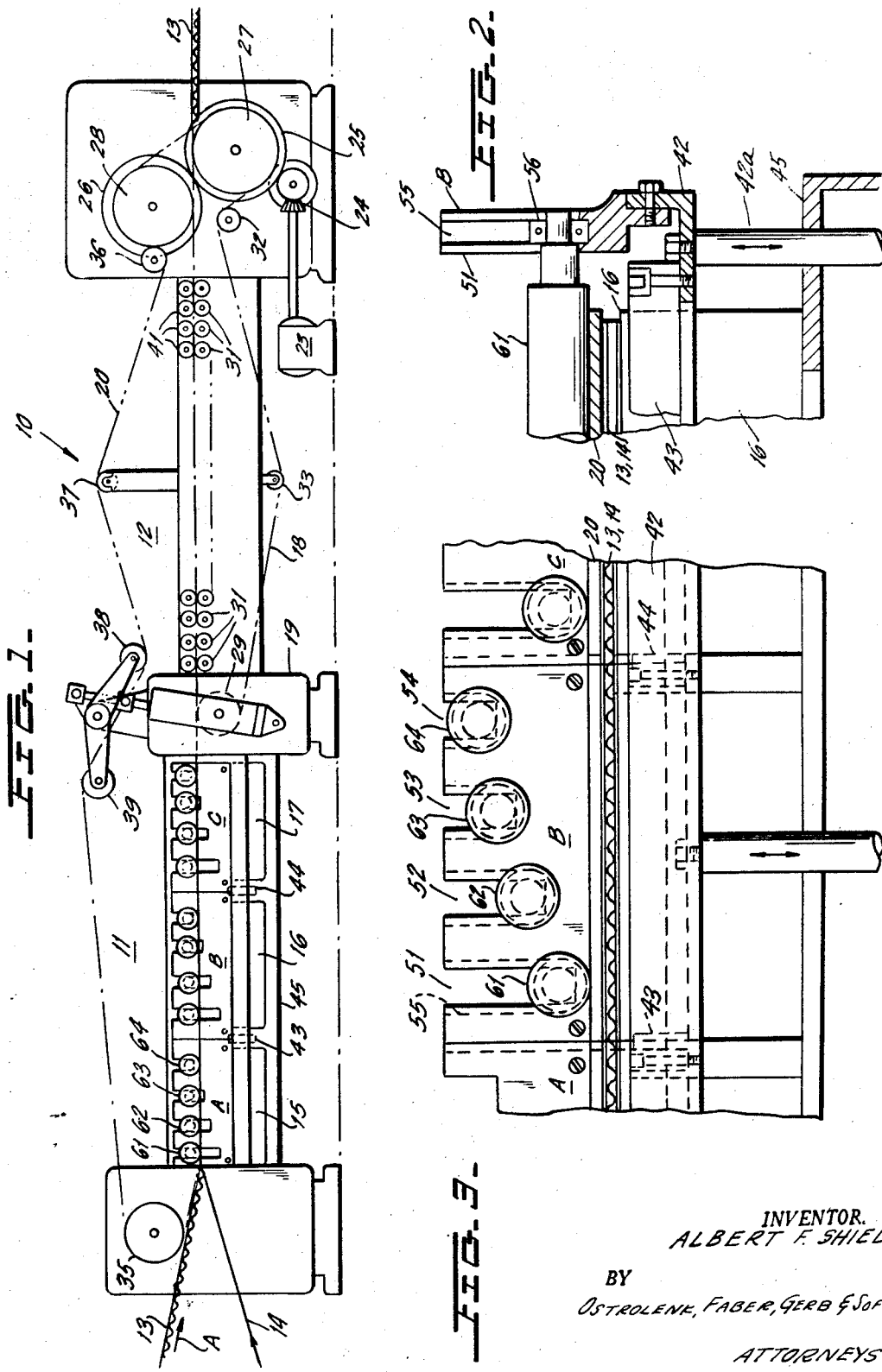

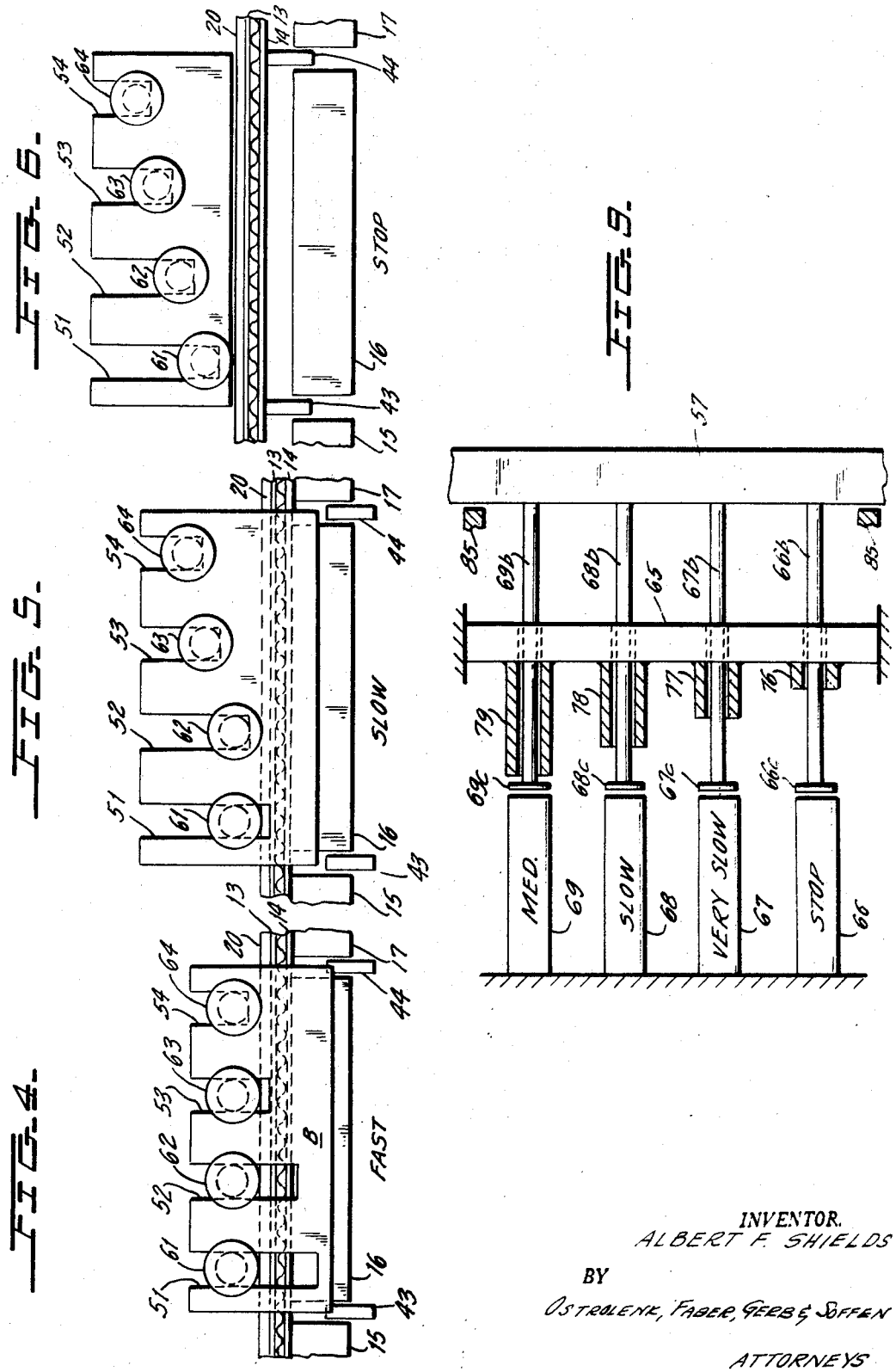

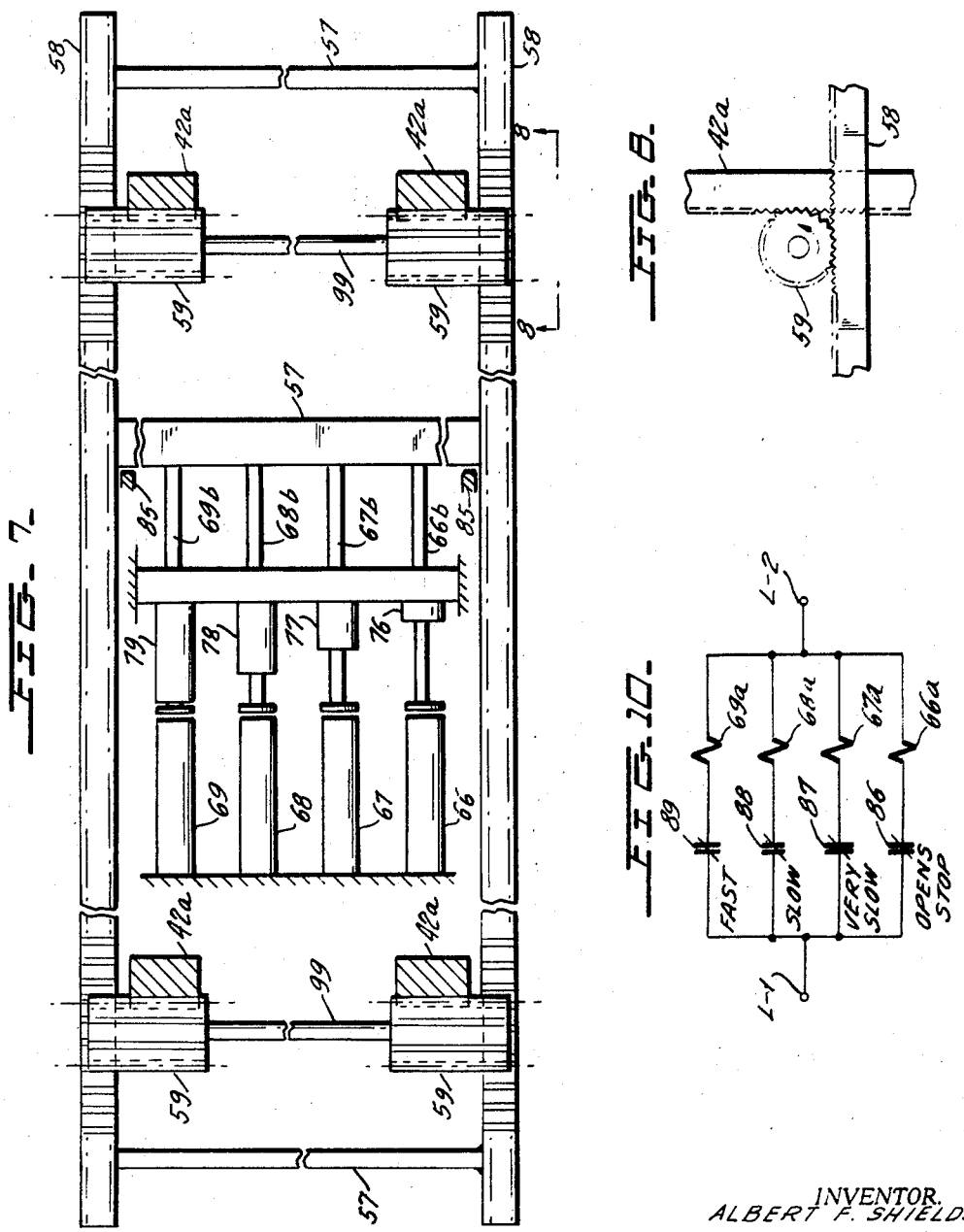

3,472,158
HEAT CONTROL FOR CORRUGATOR
Albert F. Shields, Forest Hills, N.Y., assignor to S & S
 Corrugated Paper Machinery Co., Inc., Brooklyn, N.Y.,
 a corporation of New York
Filed Mar. 23, 1967, Ser. No. 625,372
Int. Cl. B30b 15/34, 5/04; B02c 11/08
U.S. Cl. 100—93                                            10 Claims

ABSTRACT OF THE DISCLOSURE

The heating section of apparatus for producing double-faced corrugated board is provided with means for controlling the degree or rate of heat transfer from the steam chests to the board. The heat control means is operated in conjunction with a conventional belt lifting mechanism which raises the belt whenever the apparatus stops producing board. Pressure rollers acting on the lower flight of the heating section belt are mounted to the belt lifting mechanism in a manner such that the faster the speed of operation, the greater will be the number of pressure rollers acting on the lower flight of the belt to force the double-faced board against the steam chests. Since the higher the speed of operation of the apparatus, the shorter will be the time during which the double-faced board is being heated, there must be increased rate of heat transfer during this short interval in order to achieve proper total heat transfer sufficient for proper curing of the board. The greater the downward force acting on the double-faced board, the more intimate is the contact between the board and the steam chests resulting in greater rate of heat transfer to the board. Thus, as apparatus speed is reduced, selected pressure rollers are moved to inactive positions and the rate of heat transfer is decreased.

---

This invention relates to apparatus for the production of multi-layer web material and more particularly relates to the construction of the heating section of apparatus for the production of corrugated paper board.

During the production of corrugated board, after the second liner sheet is applied in a so-called double-backer the newly formed double-faced board passes through a heating section where the board is supported by and passes over a series of transversely extending heated platens or steam chests. Heat transferred from the platens to the corrugatd board serves to cure the glue holding the liners to the corrugated layer and also dissipates moisture given off by this glue and moisture in the corrugated board itself.

If too small a quatity of heat is applied to the corrugated board in the heating section, not enough moisture is driven off resulting in so-called green board. If too great a quatity of heat is applied in the heating section, the board may shrink, warp or curl and/or the paper fibers may be damaged resulting in brittle board. Thus, it is necessary to control the degree of heating of the board in the heating section for all speeds of the double-backer.

However, practical operating conditions present certain difficulties. For example, a significant period of time is required in order to change the temperature of the relatively large steam chests so that as the apparatus is slowed down, unlss other techniques are utilized, the rate of heat transfer remains essentially the same so that the corrugated board is subjected to overheating. The prior art has provided means for quickly regulating heat transfer from the steam chests to the board by varying the amount of steam chest surface engaged by the board.

For a prior art approach to the problem of quickly varying the rate of heat transfer to the corrugated board in the heating section, reference is made to U.S. Patent 2,941,573 issued June 21, 1960 to R. T. Cassady for a Method of and Apparatus for Regulating Corrugating Machines. More particularly, said Patent 2,941,573 shows an embodiment wherein selected steam chests are moved away from contact with the corrugated board with the number of steam chests so moved being related to the rate of heat transfer desired. In another embodiment, portions of the corrugated board are raised to positions spaced from the steam chests. Naturally, reduced contact between the corrugated board and steam chests results in reduced rate of heat transfer.

The prior art approach using movable steam chests is relatively expensive since the chests must be manufactured and mounted with great precision so that the upper surfaces of all chests lie in a single plane. The chests are relatively heavy requiring a heavy duty movable support that must be manufactured to close tolerances.

Further, when a substantial number of the steam chests are moved out of engagement with the corrugated board, substantial portions of the board are unsupported so that there is a good deal of sagging of the board between supported areas resulting in the production of wavy board. Similarly, the mechanism for raising the board off of the steam chests leaves substantial portions of the board unsupported also resulting in the production of wavy board.

The instant invention provides means for varying the rate of heat transfer from the steam chests to the board without the danger of producing wavy board. That is, apparatus embodying the instant invention includes fixed steam chests which continuously support the board in the heating section. The amount of contact between the board and steam chests is not varied in order to control heat transfer. Instead, the continuous moving belt in engagement with the upper surface of the board is held in contact therewith by a variable number of transverse roller weights. For a given speed of board travel maximum heat transfer takes place when all of the roller weights act downwardly upon the lower flight of the moving belt. The rate of heat transfer becomes less as the number of roller weights acting on the lower flight of the belt is decreased.

In one embodiment of the instant invention, means responsive to board speed is used to control the number of roller weights in contact with the lower flight of the belt to maintain heat transfer within specified limits regardless of board speed.

As will hereinafter be shown in detail, it is a relatively simple matter to incorporate the instant invention into existing apparatus. That is, in existing double-backers a so-called belt lifter mechanism is provided to lift the corrugated board and pressure belt to positions spaced from the steam chests whenever the board stops moving across the steam chests. This same lifting mechanism is utilized to lift the pressure rollers acting on the lower flight of the pressure belt.

Accordingly, a primary object of the instant invention is to provide novel means for controlling the rate of heat transfer to double-faced board in the heating section of a double-backer.

Another object is to provide apparatus of this type which may readily be added to existing double-backers.

A further object is to provide apparatus of this type in which the number of pressure rolls applying pressure in the heating section at a given time is inversely related to speed of operation of the apparatus at that time.

These objects as well as other objects of the instant invention will become readily apparent after reading the following description of the accompanying drawings in which:

FIGURE 1 is a side elevation showing the general form of a double-backer machine constructed in accordance with the teachings of the instant invention.

FIGURE 2 is a fragmentary view showing the mounting for one end of a pressure roller in the heating section of the double-backer.

FIGURE 3 is an enlargement of a fragmentary portion of FIGURE 1 illustrating the rollers of one section during very slow speed operation.

FIGURES 4 through 6 are views similar to FIGURE 3 for different operational speeds of the apparatus. In FIGURE 4 the apparatus is operating at its fastest speed. In FIGURE 5 operation is at slow speed and in FIGURE 6 the apparatus is stopped.

FIGURE 7 is a plan view in schematic form showing the mechanical lifting elements for the pressure rollers.

FIGURE 8 is a schematic looking in the direction of arrows 8—8 of FIGURE 7 and showing the relationship between selected elements of FIGURE 7.

FIGURE 9 is an enlarged fragmentary perspective of FIGURE 7 illustrating the power cylinders for operating the pressure rollers.

FIGURE 10 is an electrical schematic showing means for controlling operation of the power cylinders of FIGURE 9.

Now referring to the figures and more particularly to FIGURE 1 which shows double-backer 10 having a heating section 11 at the infeed end thereof and pulling section 12 at the outfeed end thereof. Single faced corrugated web 13 is fed in the direction indicated by arrow A and meets backing web 14 which is joined in face-to-face relationship to the corrugated layer of single faced web 13 by adhesive on the lower crowns of the corrugated layer. In heating section 11, composite web 13, 14 is supported from below by a series of steam chests 15–17 having coplanar upper horizontal surfaces. Longitudinally extending frame members 45 fixedly support steam chests 15–17. Heat emitted from steam chests 15–17 is transferred to the composite web 13, 14 to set the adhesive on the corrugated layer and to drive off excess moisture in the web material.

From heating section 11 composite web 13, 14 passes into pulling section 12 where the upper flight of continuous driven belt 18 provides a lower support for the composite web 13, 14. Web material 13, 14 is pulled through double-backer 10 by virtue of the fact that webs 13, 14 are sandwiched between the upper flight of belt 18 and the section of the lower flight of continuous moving belt 20 in pulling section 12.

Belt 18 extends only the length of pulling section 12 while belt 20 extends over the combined lengths of heating section 11 and pulling section 12. Driving power for belts 18 and 20 is provided by variable speed motor 23 acting through bevel gear means 24, as well as through gears 25 and 26, to rotate pull rolls 27, 28. The upper flight of belt 18 is horizontal and extends between idler 29 and drive pulley 27 being supported therebetween by a plurality of idlers 31, 31, etc. The lower flight of belt 18 passes above idler 32 and below idler 33.

The lower flight of upper belt 20 is horizontal through most of the length thereof and extends from idler 35 at the infeed end of heating section 11 to drive pulley 28 at the outfeed end of pulling section 12. The upper flight of belt 20 is guided by idlers 36, 37 as well as idlers 38, 39 of flight-actuated tensioning means 19. In pulling section 12 the lower flight of belt 20 supports idlers 41 which exert a downward pressure thereon. In heating section 11 the lower flight of belt 20 is positioned to support idler rollers mounted to grooved carrier plates A, B, C in a manner and for a purpose to be hereinafter described in detail.

In a manner well known to the art, double-backer 10 is provided with vertically movable horizontal frame members in the form of angle brackets 42 extending longitudinally of heating section 11 and positioned at opposite sides thereof. Horizontal belt lifter bars 43, 44 extend transverse to the path of movement of webs 13, 14 and are secured at their ends to movable frame members 42, 42 so as to be movable up and down therewith.

Belt lifter bars 43, 44 are positioned so as to be movable in the spaces between steam chests 15, 16, 17 so that when movable frame members 42, 42 are moved upward to their highest positions belt lifter bars 43, 44 move above the upper surfaces of steam chests 15, 16, 17 and in so doing lift the composite web 13, 14 clear of steam chests 15, 16, 17. This lifting of composite web 13, 14 takes place when drive motor 23 is stopped and prevents excessive heating of web 13, 14 and belt 20.

A set of plates A, B, C is mounted in each of the movable frame members 42, 42. Since all of the plates A, B, C are of identical construction and the rollers carried thereby are mounted in the same manner only a description of plate B will be given herein. Plate B is positioned in vertical plane and is provided with four vertical slots 51–54 spaced along the length of double backer 10. Each of the slots 51–54 extends downward from the upper edge of plate B but their lengths are graduated. That is, the bottom of slot 51 is lower than the bottom of slot 52, which in turn is lower than the bottom of slot 53, while the bottom of slot 54 is above the bottom of slot 53. The vertical walls of each of the slots 51–54 are provided with guide grooves 55 which receive bearing assembly 56 to provide vertical guidance therefor and to retain bearing assembly 56 mounted to plate B. Pressure roller 61, engageable with the lower flight of upper belt 20, is provided at each end thereof with a reduced portion mounted in bearing assembly 56 so as to be freely rotatable and to be movable vertically. Pressure rollers 62, 63, 64 are mounted to additional bearing assemblies 56 guided for vertical movement by grooves in the vertical walls of slots 52, 53, 54, respectively.

It should now be obvious that when movable frame members 42, 42 are in their lowermost positions all four of the rollers 61–64 (FIGURE 4) rest against the lower flight of upper belt 20 thereby exerting downward forces transmitted through belt 20 to composite web 13, 14 urging the latter into intimate contact with the upper support surface of steam chest 16 to facilitate heat transfer from steam chest 16 to composite web 13, 14. As movable frame members 42, 42 rise, first the bottom of slot 54 picks up the bearing assembly 56 supporting roller 64 and lifts the latter clear of belt 20 so that roller 64 no longer exerts downward pressure urging web 13, 14 into contact with steam chest 16. Continued upward movement of frame members 42, 42 causes the bottom boundary wall of slot 53 to pick up the bearing assembly 56 supporting rollers 63 thereby raising the latter clear of belt 20 (FIGURE 5). Additional upward movement of frame members 42, 42 causes roller 62 (FIGURE 3) and then roller 61 to be lifted clear of the lower flight of belt 20 and finally belt lifter bars 43, 44 move above the upper surfaces of steam chests 15–17 (FIGURE 6) and in so doing lift composite web 13, 14 clear of steam chests 15–17.

The lifting mechanism for frame members 42, 42 is shown in schematic form in FIGURES 7 through 10. More particularly, movable frame members 42, 42 are each provided with a plurality of downward extensions 42a guided for vertical movement by guide means (not shown). As best seen in FIGURE 8, each of the members 42a is provided with a rack portion in engagement with an individual spur gear 59 in mesh with the rack portion of members 58, 58 guided for horizontal movement by suitable guide means (not shown). Spur gears 59 are keyed to stationary shafts 99. Transverse tie rods 57, 57 secure members 58, 58 together for movement in unison. Thus, as members 58 move to the right with respect to FIGURE 8 spur gear 59 rotates counterclockwise and in so doing imparts upward movement to member 42a.

Movement of members 58 to the right with respect to FIGURES 7 and 8 is achieved by fluid-actuated power cylinders 66–69 controlled by solenoids 66a–69a, respectively, connected electrically as in the schematic of FIG- URE 10. Piston extensions or operating rods 66b–69b of cylinders 66–69, respectively, extend through horizontal guide openings in member 65 and are engageable with one of the tie rods 57. Rods 66b–69b also extend through stop sleeves 76–79, respectively, mounted to member 65 and are provided with stop projections 66c–69c, respectively. Thus, when cylinder 69 is actuated rod 69b engages tie rod 57 moving the latter to the right with respect to FIGURE 9 and in so doing operating members 58, 58 to the right with respect to FIGURE 8. The stroke of rod 69b is limited by the engagement of stop 69c with sleeve 79. Naturally, similar actions take place when any of the other cylinders 66–68 are actuated. It is noted that sleeve 76 associated with cylinder 66 is the shortest of sleeve 76–79 so that the stroke for rod 66b is the longest of the strokes for rods 66b–69b. When cylinders 66–69, or any of them are deactuated, the weight of movable frame members 42, 42, transmitted through extensions 42a, causes rods 66b–69b to retract.

The operation of cylinders 66–69 occurs automatically, being controlled by normally closed switches 86–89 connected in circuit with solenoids 66a–69a. Each of the switches 86–89 opens at a different preselected speed of operation for drive motor 23. As seen in FIGURE 10, normally closed switch 86 is connected in series with solenoid 66a with this series combination being connected between terminals L–1 and L–2 which are in turn connected to a source of electrical energy (not shown). Similarly, switch 87 is in series combination with solenoid 67a, switch 88 is in series combination with solenoid 68a, and switch 89 is in series combination with solenoid 69a with each of these series combinations being connected in parallel with the series combination of switch 86 and solenoid 66a.

With drive motor 23 operating at full speed all of the switches 86–89 are open so that none of the cylinders 66–69 are actuated. Under these circumstances movable frame members 42, 42 are in their lowermost positions being limited in their downward movement by the engagement of tie bar 57 with stops 85, 85 (FIGURE 9). Under these circumstances all four rollers 61–64 mounted to each of the plates A, B, C rest upon the lower flight of upper belt 20 (FIGURE 4) and are effective in urging composite web 13, 14 into intimate contact with steam chests 15–17. Under these circumstances there is a maximum rate of heat transfer from steam chests 15–17 to the composite web 13, 14.

When drive motor 23 slows down slightly, say to a medium speed, switch 89 closes thereby energizing solenoid 69a and actuating cylinder 69. Rod 69b of cylinder 69 is ejected to the right through a very short stroke limited by the engagement of stop 69c with sleeve 79. This moves extensions 42a upward a distance sufficient to raise plates A, B, C to a point where the bottom boundaries of slots 54 move rollers 64 upward out of engagement with the lower flight of belt 20. During this period rollers 61, 62, 63 remain in engagement with the lower flight of belt 20. With only three out of every four of the rollers 61–64 in engagement with the lower flight of belt 20, less force is exerted on the composite web 13, 14 so that the rate of heat transfer from steam chests 15–17 to composite web 13, 14 is reduced.

With a further decrease in speed of drive motor 23, say to a slow speed, both switches 88 and 89 close. In particular, the closing of switch 88 actuates solenoid 68a thereby actuating fluid cylinder 68 to operate rod 68b thereof through a stroke limited by the engagement of stop 68c with sleeve 78. This moves plates A, B, C upward a distance sufficient to disengage rollers 63, 64 from the lower flight of belt 20 (FIGURE 5) thereby further reducing the force acting downward on the composite web 13, 14 which in turn additionally reduces the rate of heat transfer thereto.

For still slower operation of drive motor 23, say a very slow speed, switch 87 closes causing fluid cylinder 67 to be actuated. This raises plates A, B, C to a height such that, within curing section 11, only rollers 61 provide a downward force on the lower flight of belt 20 (FIGURE 3).

When drive motor 23 stops, switch 86 closes thereby actuating fluid cylinder 66 to move its operating rod 66b to the long stroke between stop 66c and sleeve 76. This raises plates A, B, C to a height such that none of the rollers 61–64 exert downward forces on composite web 13, 14 and bars 43, 44 lift composite web 13, 14 clear of steam chests 15–17 (FIGURE 6).

Thus, it is seen that as the speed of drive motor 23 decreases, within heating section 11, the number of pressure rollers acting downward on the lower flight of upper belt 20 decreases. This in turn decreases the rate of heat transfer from steam chests 15–17 to the composite web 13, 14 and prevents an excess of total heat from being applied to composite web 13, 14 as the linear speed thereof decreases.

Naturally, during the period when drive motor 23 starts up, as the speed thereof increases, there is a stepped lowering of plates A, B, C resulting in the gradual application of increasing downward forces on the lower flight of upper belt 20 as it passes through heating section 11.

Thus it is seen that the instant invention provides novel and relatively inexpensive means for controlling the rate of heat applications to web material passing through the heating section of a continuous process machine.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In a process for adhesively joining traveling webs in face-to-face relationship for continuous production of a composite web including advancing freshly glued traveling webs linearly while supported from below by a heated support means and engaged from above by the lower flight of a traveling belt and applying force acting downwardly against said lower flight which is transmitted therethrough to urge said webs into intimate contact with said support means, the improvement comprising controlling rate of heat transfer from said support to said traveling webs by controlling the magnitude of the force acting downwardly against said lower flight.

2. A process as set forth in claim 1 in which the magnitude of the force is increased as the speed of the traveling web increases.

3. A process as set forth in claim 1 in which the force acting downwardly against said lower flight is derived from a plurality of rollers acting against said lower flight from above.

4. A process as set forth in claim 3 in which the number of said plurality of rollers acting against said lower flight is increased as the speed of said traveling web increases.

5. A process as set forth in claim 3 in which each roller of said plurality of rollers is gravity loaded.

6. Apparatus for adhesively joining traveling webs in face-to-face relationship for continuous production of a composite web, said apparatus including a heated support means for supporting the webs from below, a traveling belt having a lower flight overlying the webs and engageable therewith, means for moving said webs longitudinally between said support and said lower flight, a plurality of longitudinally spaced transversely extending rollers engageable with said lower flight for applying a force urging said webs into intimate contact with said support means, mounting means mounting said plurality of rollers so that each roller thereof is movable between an active and an inactive poistion, each of said rollers when in its active position engaging said lower flight to exert a downward component of force thereon, each of said rollers when in its inactive position being spaced from said lower flight so as not to exert a component of force thereon, said mounting means constructed to operate an increasing number of said rollers to active positions with an increase in speed of movement of said webs.

7. Apparatus as set forth in claim 6 in which said mounting means includes transversely spaced longitudinally extending frame members mounted for movement from a low to a high position; said mounting means also including lost motion connections between said rollers and said frame members construced so that with said frame members in said low position all of said rollers are in their active positions wherein they are gravity loaded to exert forces directed downward on said lower flight, with said frame members in said high position all of said rollers are in their inactive positions, and an increasing number of said rollers are operated to their respectivce inactive positions as said frame members move from said low position toward said high position.

8. Apparatus as set forth in claim 7 also including lifting means for raising said lower flight to a position spaced from said support means, said lifting means mounted to said frame members for movement therewith whereby said lifting means raises said lower flight away from said support when said frame members are in said high position.

9. Apparatus as set forth in claim 7 in which said rollers are arranged in longitudinally spaced groups, said lost motion connection to the rollers within a group providing different degrees of lost motion whereby at a position of said frame members intermediate said high and low positions some of said rollers of each of said groups are in active positions while the remaining roller are supported by said frame members in inactive positions.

10. Apparatus as set forth in claim 9 also including lifting means for raising said lower flight to a position spaced from said support means, said lifting means mounted to said frame members for movement therewith whereby said lifting means raises said lower flight away from said support when said frame members are in said high position.

References Cited

UNITED STATES PATENTS

| | | | |
|---|---|---|---|
| 978,234 | 12/1910 | Taylor | 100—154 X |
| 2,941,573 | 6/1960 | Cassady | 156—60 |

PETER FELDMAN, Primary Examiner

U.S. Cl. X.R.

100—154; 156—60